Nov. 21, 1950
W. D. MACGEORGE
2,531,228
TORQUE MEASURING SYSTEM
Filed May 23, 1945
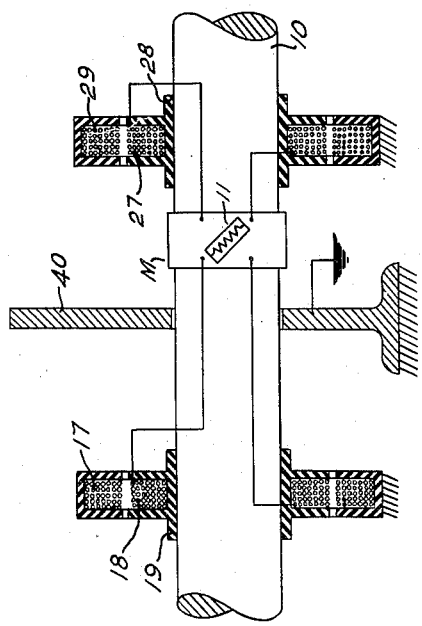
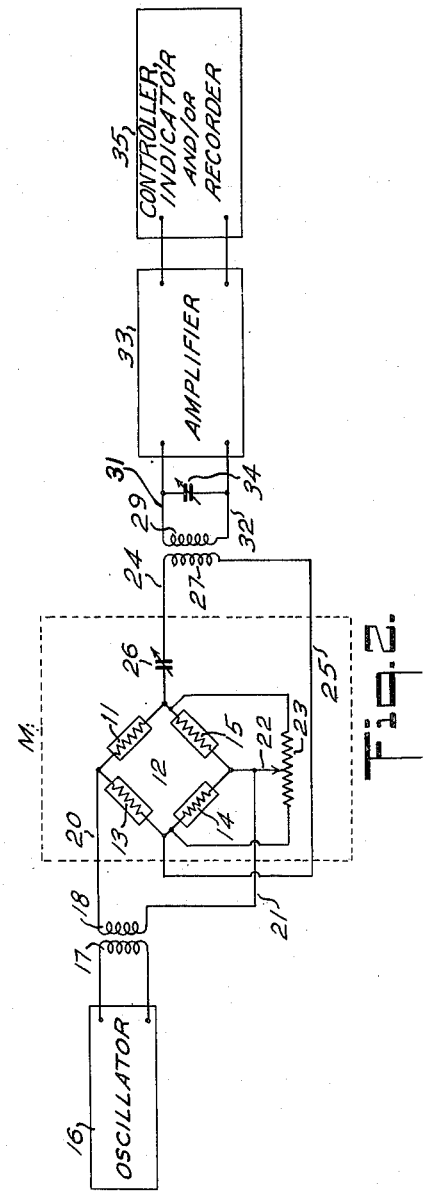
INVENTOR.
WILLIAM D. MACGEORGE
BY
ATTORNEY Patented Nov. 21, 1950

2,531,228

UNITED STATES PATENT OFFICE 2,531,228

TORQUE MEASURING SYSTEM

William D. Macgeorge, Drexel Hill, Pa., assignor to The Baldwin Locomotive Works, a corporation of Pennsylvania Application May 23, 1945, Serial No. 595,294

2 Claims. (Cl. 73—136)

This invention relates to systems for measuring certain conditions associated with relatively movable members such as for measuring the torque of a shaft.

An object of the invention is the provision of a simple and reliable means for eliminating sliding contacts in the measuring system for conducting condition responses from the rotating member to an external point.

The accurate measurement of the above conditions in rotating shafts, of which torque will be referred to here for purposes of explanation, has heretofore been a very difficult and imperfectly solved problem. The difficulty in part sometimes arises from the high centrifugal forces involved, or the vibration, or the need to mount on the shaft itself condition responsive or pickup means. It has heretofore been proposed to apply a condition responsive pickup, e. g. electrical strain gages, to shafting for the measurement of the torque but the variations in the resistance of the slip rings used in connection therewith left much to be desired. The electric strain gages themselves of the type disclosed herein have been quite satisfactory because when properly located on the shaft their change of impedance in response to a change of shaft strain varies with the applied torque.

In carrying out the present invention in one form thereof, one or more strain gages may be secured to the rotating member whose torque is to be measured. These strain gages may be included in an electrical network which will be unbalanced with change in the electrical resistance of one or more of the strain gages where the gages are of the resistance type. The present invention as specifically disclosed herein for the purpose of illustrating one particular form is characterized by the provision of a pair of input coils, one of which is secured to the shaft and the other of which is mounted in inductive relation thereto. Electrical power is supplied to the stationary coil and by induction to the rotating coil and thence to the strain responsive gage network. The output from this strain responsive network is applied to a second pair of coils, one of which is secured to the shaft and the other of which is stationary. An indicating or recording device is connected to the output coil for indicating and/or recording the torque applied to the rotating member. In this manner there is avoided the use of slip rings, and of any other means which require sliding conductive contacts between relatively movable parts.

Further, in accordance with the invention, there is provided a magnetic and electrostatic shield to minimize electrical and magnetic effects of one set of coils upon the other. Further, in accordance with the invention, the output from the strain-responsive means is magnified by the utilization of series-resonant and parallel-resonant circuits.

For a more complete understanding of the invention, and for further objects and advantages thereof, reference should be had to the following description taken in conjunction with the accompanying drawing, in which:

Fig. 1 diagrammatically illustrates one embodiment of the invention; and

Fig. 2 is a schematic wiring diagram of Fig. 1.

Referring to Fig. 1, the invention in one form has been illustrated as applied to the measurement of torque applied to a shaft 10. It is well understood by those skilled in the art that the application of torque to a shaft results in a torsional strain which appears as tension and compression respectively at 45° from the shaft axis and 90° from each other. Accordingly, the resistance of a strain-responsive means 11 cemented to the shaft 10 with the resistance wire thereof disposed at approximately a 45° angle, with a line parallel to the axis of the shaft 10 will vary with the strain of the shaft. The strain-responsive means 11 is preferably of the type disclosed in Simmons No. 2,292,549 but any other well-known electrical pickup may be used whose impedance varies with strain. When cemented to the shaft 10, the resistance of the bonded wire type gauge 11 will vary in accordance with the torsional strain which exists at the surface of the shaft itself.

As shown in Fig. 2 the gage 11 is included in a measuring network 12 which includes additional resistors 13, 14 and 15. To avoid temperature effects the resistor 13 is preferably a strain gage like the strain gage 11, and if desired, need not be subjected to the torsional strain of the shaft 10, although both temperature compensation and greater sensitivity will accrue if the resistor 13 is cemented to the shaft so that one gage is in tension and the other in compression and similarly for the other two gages 14 and 15.

For measuring networks of the preferred type, it is necessary to supply power thereto and to provide an output circuit in which the voltage varies with changes in the resistance of the strain gage 11. Because such resistance changes are small, variations of resistance in the circuit due to any other causes greatly interfere with the accuracy of the system.

In accordance with the invention, a suitable source of power supply such as the oscillator 16 is provided. It is connected to a stationary coil 17 which, Fig. 1, surrounds the shaft 10. Disposed in inductive relation therewith is a secondary input coil 18 secured by hub 19 to the shaft. Current flowing from the oscillator 16 through the primary input coil 17 induces a voltage in the secondary input coil 18 which by means of conductors 20 and 21 is applied to the input terminals of the measuring network 12, of the Wheatstone bridge type.

Initially, that is, before application of torque to the shaft 10, the Wheatstone bridge 12 will be balanced. It may be readily brought into balance by moving a slidable contact 22 with respect to a resistor 23, connected across the resistors 14 and 15. The effect of this adjustment is to shift resistance from one side of the bridge to the other. This is done until the bridge is in balance. Application of torque to the shaft 10 will then cause the resistor or strain gage 11 to change its electrical resistance to unbalance the bridge. In consequence, a potential difference will appear across the output conductors 24 and 25. Included in the output circuit is a variable capacitor 26 and a primary output coil or winding 27. The coil 27 is secured to the shaft 10 as by the hub 28. Surrounding it is a stationary secondary winding 29. The capacitor 26 is adjusted with reference to the inductance of the coil 27 so as to tune the output circuit to resonance. By so tuning the circuit, advantage is taken of the characteristics of a series-resonant circuit; that is, a maximum current will flow through the coil 27 in response to the potential difference produced by the strain-responsive means 11. Accordingly, there will be induced in the output secondary coil 29 an amplified voltage which, by means of the output conductors 31 and 32, is applied to a thermionic amplifier 33. The amplifier 33 is primarily a voltage-responsive device. Further to increase the input thereto, a variable capacitor 34 is connected across the output coil 29, and is adjusted to tune the circuit to resonance. In consequence there is produced maximum change in voltage on the output conductors 31 and 32 because of the parallel resonance characteristics thereof. The amplifier itself is connected to an indicator and/or recorder 35, which may be calibrated in terms of the torque applied to the shaft 10.

Now that the principles of the invention have been explained, it will of course be understood that more than a single strain gage 11 may be utilized. In some cases it may be desirable to utilize four strain gages each secured to the shaft 10 at angles of 45° with respect to the axis of the shaft, and each adjacent strain gage being angularly displaced with respect to the other. Obviously a sensitive indicator and/or recorder may be conneced directly to the conductors 31 and 32 whenever the output is adequate to operate it directly. In general the measuring network is secured to the shaft as indicated by the rectangle M, the network also including the variable capacitor 26.

The oscillator 16 preferably supplies alternating current of a frequency which materially differs from that of the usual 60-cycle power supply circuit. Though the frequency is not critical, alternating currents of ten thousand cycles per second have been found satisfactory, though the frequency may be more or less as may be desired. Further, in accordance with the invention, there is provided between the input coils 17—18 and the output coils 27—29 a combined electromagnetic and electrostatic shield 40 of magnetic material. It is connected to ground and it has a diameter substantially greater than that of the stationary coils 17 and 29. In order to provide maximum magnetic shielding it is made relatively thick, that is it may have a thickness of one-half inch or more. Where the frequencies are high it is effective as an electrostatic shield, and for lower frequencies its primary effect is as a magnetic shield. Of course it functions at all times for both purposes to minimize the effect of the electric and magnetic fields of one set of coils 17—18 upon the other set of coils 27—29. The shield 40 may be adjustable axially of the shaft since it is supported separately therefrom. It is adjusted for a maximum shielding effect. When external magnetic fields are present it has been found that the testing apparatus as a whole may be turned in a different direction to minimize the effects thereof, though in general the system will function satisfactorily with the shaft extending in any direction.

Now that a preferred modification of the invention has been described, it will be apparent to those skilled in the art that other modifications may be made and it is, therefore, intended to set forth the true spirit and scope of the invention by the appended claims.

I claim:

1. In a torque-measuring system of the type in which a strain-responsive resistor is secured to a rotatable member subjected to torque, the combination of a pair of inductively associated input windings, a pair of inductively associated output windings, means for securing one winding of each of said pairs to said member, a measuring network of the Wheatstone bridge type which includes said strain-responsive resistor, means including said input windings for supplying power to said Wheatstone bridge, an output circuit from said bridge connected to the one of said output windings secured to said rotatable member for producing a voltage across the other output winding which varies with change in the resistance of said resistor, said output circuit including capacitors for producing series resonance in that part of the circuit including said movable output winding and for producing parallel resonance across said stationary output winding.

2. In a torque-measuring system of the type in which a strain-responsive resistor is secured to a rotating shaft for varying its resistance in responce to torsional strain thereof, the combination of a pair of windings, one of which is stationary and is energized with alternating current and the other of which is rotatable with said shaft and inductively associated with said stationary winding, means including said first pair of windings for supplying power to said resistor, a second pair of inductively associated windings one of which is stationary and the other of which is rotatable with said shaft, a measuring network connected to said second rotatable winding for rotation with said shaft and including said resistor, a capacitor connected across the stationary winding of said second pair to produce parallel resonance thereof, a capacitor connected in series-circuit relation with said rotatable winding of said second pair for producing series resonance thereof, and a magnetic and electrostatic shield disposed between said pairs of windings.

WILLIAM D. MACGEORGE.

(References on following page)

REFERENCES CITED

The following references are of record in the file of this patent:

UNITED STATES PATENTS

| Number | Name | Date |
|---|---|---|
| 925,180 | Harris | June 15, 1909 |
| 1,775,276 | Ferguson et al. | Sept. 9, 1930 |
| 2,065,884 | Braden | Dec. 29, 1936 |
| 2,073,394 | MacMillan | Mar. 9, 1937 |
| 2,292,549 | Simmons | Aug. 11, 1942 |
| 2,386,008 | Shank | Oct. 2, 1945 |
| 2,392,293 | Ruge | Jan. 1, 1946 |
| 2,415,513 | Martin et al. | Feb. 11, 1947 |
| 2,431,260 | Langer | Nov. 18, 1947 |

FOREIGN PATENTS

| Number | Country | Date |
|---|---|---|
| 385,792 | Germany | Nov. 29, 1923 |
| 470,454 | Germany | Jan. 15, 1929 |
| 485,967 | Germany | Nov. 11, 1929 |

OTHER REFERENCES

Pages 686 and 690 only of vol. 63 of Electrical Engineering, Sept. 1944, these pages having parts of an article "Aircraft-Engine Torque Instru.," by F. W. Godsey and B. F. Langer. Copy in (177–351–10).